(12) United States Patent
Hashiba et al.

(10) Patent No.: US 8,337,723 B2
(45) Date of Patent: Dec. 25, 2012

(54) ELECTROCONDUCTIVE MATERIAL AND POSITIVE ELECTRODE MATERIAL FOR LITHIUM ION SECONDARY BATTERY USING THE SAME

(75) Inventors: Yuji Hashiba, Narita (JP); Shinichi Tachizono, Narita (JP); Kei Yoshimura, Inzai (JP); Takashi Naito, Funabashi (JP); Takuya Aoyagi, Hitachi (JP)

(73) Assignees: Hitachi Powdered Metals Co., Ltd., Chiba (JP); Hitachi, Ltd., Tokyo (JP)

( * ) Notice: Subject to any disclaimer, the term of this patent is extended or adjusted under 35 U.S.C. 154(b) by 357 days.

(21) Appl. No.: 12/828,393

(22) Filed: Jul. 1, 2010

(65) Prior Publication Data

US 2011/0001094 A1     Jan. 6, 2011

(30) Foreign Application Priority Data

Jul. 2, 2009   (JP) .................... 2009-157394

(51) Int. Cl.
  *C03C 4/14* (2006.01)
  *C04B 111/94* (2006.01)
  *H01B 1/00* (2006.01)
(52) U.S. Cl. ........ 252/500; 252/503; 252/506; 252/509; 252/518.1; 252/519.13; 252/519.14; 429/218.1
(58) Field of Classification Search ............... 252/500, 252/503, 506, 509, 518.1, 519.13, 519.14; 429/218.1
See application file for complete search history.

(56) References Cited

U.S. PATENT DOCUMENTS 5,498,494 A * 3/1996 Takeuchi et al. ............. 429/219
2011/0070500 A1 * 3/2011 Chen et al. ............. 429/231.95

FOREIGN PATENT DOCUMENTS

| EP | 0 634 803 A1 | 1/1995 |
|---|---|---|
| JP | 39-9140 | 5/1964 |
| JP | 1-128355 | 5/1989 |
| JP | 08-083606 | 3/1996 |
| JP | 2973830 | 9/1999 |
| JP | 2003-034548 | 2/2003 |
| JP | 2005-506272 | 3/2005 |
| JP | 2007-042618 | 2/2007 |
| JP | 2009-016277 | 1/2009 |
| WO | WO 03/036742 A2 | 5/2003 |

OTHER PUBLICATIONS

Garbarczyk et al., Enhancement of Electrical Conductivity in Lithium Vanadate Glasses by Nanocrystallization, Solid State Ionics, vol. 175, No. 1-4, Nov. 30, 2004, pp. 691-694.
Walk et al., δ-$LiV_2O_5$ as a Positive Electrode Material for Lithium-Ion Cells, Journal of Power Sources, vol. 68, Dec. 16, 1996, pp. 723-725.
Zheng et al.., $Li_3V_2(PO_4)_3$ Cathode Material Synthesized by Chemical Reduction and Lithiation Method, Journal of Power Sources, Vo. 189, No. 1, Apr. 1, 2009, pp. 476-479.
EP Search Report dated Apr. 26, 2011 in English.

* cited by examiner

*Primary Examiner* — Nathan M Nutter
(74) *Attorney, Agent, or Firm* — Antonelli, Terry, Stout & Kraus, LLP.

(57) ABSTRACT

Disclosed is an electroconductive material which contains at least a vanadium oxide and a phosphorus oxide, and has a crystalline structure composed of a crystalline phase and an amorphous phase, in which the crystalline phase contains a monoclinic vanadium-containing oxide, and a volume of the crystalline phase is larger than that of the amorphous phase. The electroconductive material has a reduced specific resistance and has improved functions as an electrode material, a solid-state electrolyte, or a sensor such as a thermistor.

20 Claims, 6 Drawing Sheets

ELECTROCONDUCTIVE MATERIAL AND POSITIVE ELECTRODE MATERIAL FOR LITHIUM ION SECONDARY BATTERY USING THE SAME

CLAIM OF PRIORITY

The present application claims priority from Japanese Patent application serial No. 2009-157394, filed on Jul. 2, 2009, the content of which is hereby incorporated by reference into this application.

BACKGROUND OF THE INVENTION

1. Field of the Invention

The present invention relates to electroconductive materials and to positive electrode materials for lithium ion secondary batteries using the same.

2. Description of Related Art

A glass based on vanadium containing vanadium pentoxide as a main component is known to be a glass semiconductor that conducts electricity and has been studied to be adopted typically to thermistors.

Japanese Examined Patent Application Publication (JP-B) No. Sho 42(1967)-24785 (Document 1) discloses a vitrified resistive material composed of a glass composition containing 50 percent by mole or more of vanadium pentoxide, containing phosphorus pentoxide and barium oxide, and further containing cerium oxide, tin oxide and lead oxide as added.

Japanese Examined Patent Application Publication (JP-B) No. Sho 39(1964)-9140 (Document 2) discloses a thermistor made of a glass containing 70 percent by mole or more of vanadium pentoxide and 5 to 15 percent by mole of phosphorus pentoxide and further containing 13 percent by mole or less of copper oxide.

Japanese Patent No. 3854985 (Document 3) discloses a glass semiconductor having a specific resistance of $10^1$ to $10^4$ $\Omega \cdot cm$ at room temperature. This glass semiconductor is prepared by heating a glass based on an oxide containing vanadium, barium and iron at a temperature equal to or higher than its glass transition temperature and equal to or lower than its crystallization temperature to reduce the strain of a glass skeleton.

FIG. 1 shows a model for a crystal structure of vanadium pentoxide ($V_2O_5$). $V_2O_5$ is an orthorhombic crystal, has a layered structure composed of $VO_5$ pyramids as illustrated in FIG. 1. And $V_2O_5$ has been investigated to be adopted to an active material for nonaqueous electrolyte secondary batteries.

Japanese Patent No. 2973830 (Document 4) discloses a secondary battery that shows satisfactory cycling performance at a high energy density, because this secondary battery includes a positive electrode active material having coexisting two phases of an amorphous phase and a crystalline phase composed of a multiple oxide of vanadium and lithium or a first-row transition metal.

Japanese Patent Application Laid-Open (JP-A) No. 2007-42618 (Document 5) discloses a battery using a glass ceramic including a glass containing a highly electroconductive lithium-containing iron vanadium phosphate. This battery has improved rate properties and improved low-temperature properties.

Japanese Patent Application Laid-Open (JP-A) No. 2009-16277 (Document 6) discloses an electrode active material mainly containing at least one of a glass and a glass ceramic each composed of a lithium-containing iron vanadium phosphate containing at least one of Co, Mn and Ni; and a secondary battery using the electrode active material, which shows high discharge rate properties and a high energy density.

Japanese Unexamined Patent Application Publication (Translation of PCT Application) (JP-A) No. 2005-506272 (Document 7) discloses an active material which is a lithium vanadium oxide corresponding to $Li_{1+x}V_3O_8$ in which $0.1 \leq x \leq 0.25$, and which has a monoclinic crystal structure; and also discloses a battery using the active material, which shows significantly improved capacity and cycling performance.

However, the glass semiconductor material disclosed in Document 3 shows a specific resistance of 200 $\Omega \cdot cm$ which is excessively high as an electrode material or solid-state electrolyte, and there is a need of providing a material having a further lower specific resistance.

When the electrode active material disclosed in Document 5 is used as an active material of a nonaqueous secondary battery and is annealed to have a specific resistance minimized to 290 $\Omega \cdot cm$ or less, the resulting secondary battery shows a decreasing battery capacity with a decreasing specific resistance. Independently, there has been provided no electrode active material that satisfies requirements to have higher capacity as battery typically for battery cars. Accordingly, investigations on active materials composed of oxides are actively made even now.

The present invention has been made to solve such problems in known techniques, and an object of the present invention is to reduce the specific resistance of an electroconductive material and to improve the function typically of an electrode material, a solid-state electrolyte, or a sensor such as a thermistor using the electroconductive material.

Another object of the present invention is to provide an electroconductive material using a glass based on vanadium which can give a battery that maintains a satisfactory battery capacity even when it has a reduced specific resistance.

SUMMARY OF THE INVENTION

The present invention provides an electroconductive material comprising a crystalline phase and an amorphous phase, and containing at least a vanadium oxide and a phosphorus oxide, wherein the crystalline phase contains a monoclinic vanadium-containing oxide, and wherein a volume of the crystalline phase is larger than that of the amorphous phase.

The electroconductive material according to the present invention has a low specific resistance of 200 $\Omega \cdot cm$ or less and thereby gives an electrode having improved functions and efficiencies. Even in other applications than electrodes, a reduced specific resistance which is a fundamental performance contributes improvement of functions and efficiencies.

DETAILED DESCRIPTION OF THE PREFERRED EMBODIMENTS

Figure 1:
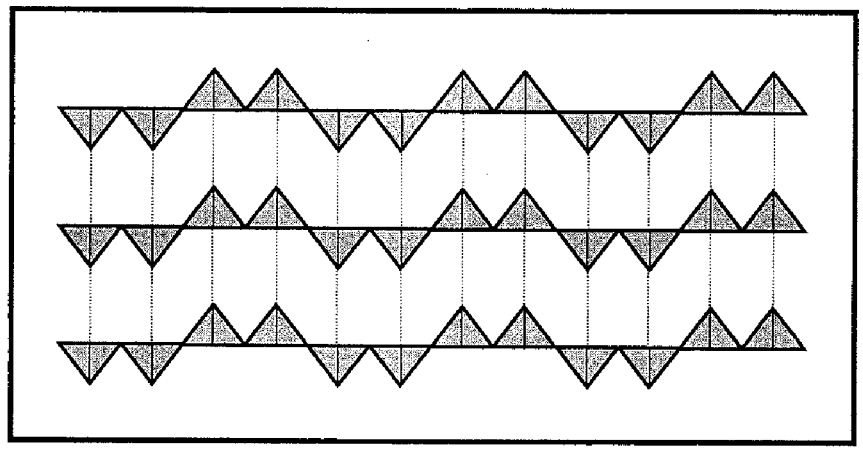
FIG. 1 is a schematic diagram of a model for a crystal structure of $V_2O_5$.

The present invention relates to an electroconductive material which is advantageously usable typically as electrode materials, solid-state electrolytes, and sensors such as thermistors, which can have a controllable electroconductivity, and which is usable as an active material for nonaqueous electrolyte secondary batteries that have a long charge/discharge cycling lifetime at a high energy density.

The electroconductive material according to the present invention is an electroconductive material including a crystalline phase (crystalline part) and an amorphous phase (noncrystalline part), and containing at least a vanadium oxide and a phosphorus oxide, wherein the crystalline phase contains a monoclinic vanadium-containing oxide, and wherein a volume of the crystalline phase is larger than that of the amorphous phase.

For achieving the objects, further improvements or modifications as mentioned below may be made on the electroconductive material according to the present invention or on a glass composition relating to the present invention.

(1) In an embodiment, the crystalline phase contains a monoclinic $M_xV_2O_5$ crystallite, where M is a monovalent cation, and x is in the range of 0.28 to 0.76, and the $M_xV_2O_5$ crystallite has a size of 50 nm to 300 nm in a direction of the (111) plane or (11-1) plane.

(2) In another embodiment, the monovalent cation M of the monoclinic $M_xV_2O_5$ crystallite is at least one element selected from the group consisting of Li, Na, K, Cu and Ag.

(3) In yet another embodiment, the crystalline phase includes a monoclinic crystal having such lattice constants that a=1.003 to 1.010 nm, b=0.360 to 0.364 nm, c=1.520 to 1.542 nm, $\alpha=\gamma=90°$, and $\beta=105.5°$ to 110.7°.

(4) In still another embodiment, the crystalline phase occupies 63% to 98% by volume of the electroconductive material and the amorphous phase occupies 2% to 37% by volume of the electroconductive material, and the amorphous phase is a glass phase including a vanadium oxide and a phosphorus oxide.

(5) In another embodiment, at least one of a grain boundary of the crystalline phase, a grain boundary of the monoclinic $M_xV_2O_5$ crystallite, and a grain boundary of a polycrystalline particle composed of a multiplicity of the monoclinic $M_xV_2O_5$ crystallites is composed of the amorphous phase.

(6) In yet another embodiment, the amorphous phase further contains at least one (an oxide) selected from the group consisting of a tungsten oxide, a molybdenum oxide, an iron oxide, a manganese oxide, a barium oxide, an antimony oxide and a bismuth oxide.

(7) In still another embodiment, the monoclinic $M_xV_2O_5$ crystallite has been precipitated through a heat treatment of a glass composition at a temperature equal to or higher than the crystallization temperature (crystallization onset temperature) of the glass composition which contains a vanadium oxide and a phosphorus oxide and further contains at least one (an oxide) selected from the group consisting of a lithium oxide, a sodium oxide, a potassium oxide, a copper oxide and a silver oxide.

(8) In another embodiment, the glass composition has a composition containing 62 to 92 percent by weight of $V_2O_5$; 5 to 20 percent by weight of $P_2O_5$; 1 to 15 percent by weight of at least one selected from the group consisting of $Li_2O$, $Na_2O$, $K_2O$, $Cu_2O$ and $Ag_2O$; and 0 to 22 percent by weight of at least one selected from the group consisting of $WO_3$, $MoO_3$, $Fe_2O_3$, $MnO_2$, $BaO$, $Sb_2O_3$ and $Bi_2O_3$ in terms of oxides, and the glass composition has a transition temperature of 300° C. or lower and a crystallization temperature (crystallization onset temperature) of 400° C. or lower.

(9) In another embodiment, the glass composition has a composition containing 70 to 80 percent by weight of $V_2O_5$; 8 to 14 percent by weight of $P_2O_5$; 1 to 5 percent by weight of one selected from the group consisting of $Li_2O$, $Na_2O$ and $K_2O$; and a total of 10 to 20 percent by weight of $WO_3$ and $Fe_2O_3$ in terms of oxides, and the glass composition has a transition temperature of 300° C. or lower and a crystallization temperature (crystallization onset temperature) of 400° C. or lower.

(10) In another embodiment, the electroconductive material has a specific resistance of 200 Ω·cm or less at 25° C.

(11) In another embodiment, there is provided an active material for a lithium ion secondary battery which includes the electroconductive material.

(12) In yet another embodiment of the active material for the lithium ion secondary battery, x in the monoclinic $M_xV_2O_5$ crystallite as the crystalline phase of the electroconductive material is in the range of 0.28 to 0.41.

(13) In still another embodiment of the active material for the lithium ion secondary battery, M (a monovalent cation) in the monoclinic $M_xV_2O_5$ crystallite as the crystalline phase of the electroconductive material is at least one selected from the group consisting of Li, Na and K.

(14) In another embodiment of the active material for the lithium ion secondary battery, the monoclinic $M_xV_2O_5$ crystallite as the crystalline phase of the electroconductive material has a lattice constant β in the range of 109.2° to 110.7°.

(15) In another embodiment of the active material for the lithium ion secondary battery, the crystalline phase of the electroconductive material occupies 80% to 95% by volume of the electroconductive material, and the monoclinic $M_xV_2O_5$ crystallite has a size of 100 nm to 300 nm in a direction of the (111) plane or (11-1) plane.

(16) In another embodiment of the active material for the lithium ion secondary battery, the electroconductive material has a specific resistance of 10 to 100 Ω·cm at 25° C.

(17) In another embodiment of the active material for the lithium ion secondary battery, lithium ions have been doped (intercalated) into the crystalline phase of the electroconductive material after the preparation of the electroconductive material.

(18) In another embodiment, the active material for the lithium ion secondary battery further contains a carbon powder.

(19) The electroconductive material is usable for the formation of electrode materials, solid-state electrolytes, and sensors such as thermistors.

Specifically, in an embodiment of the electroconductive material according to the present invention, the monoclinic vanadium-containing oxide may include a $M_xV_2O_5$ crystallite, where M is a monovalent cation; and x is in the range of 0.28 to 0.76, in which the $M_xV_2O_5$ crystallite may have a diameter of 50 nm to 300 nm in a direction of the (111) plane or (11-1) plane.

In the electroconductive material according to the present invention, the monovalent cation M of the $M_xV_2O_5$ crystallite may include at least one element selected from the group consisting of Li, Na, K, Cu and Ag.

In the electroconductive material according to the present invention, the crystalline phase may include monoclinic crystal having such lattice constants that a=1.003 to 1.010 nm, b=0.360 to 0.364 nm, c=1.520 to 1.542 nm, $\alpha=\gamma=90°$, and $\beta=105.5°$ to $110.7°$.

In the electroconductive material according to the present invention, the crystalline phase preferably occupies 63% to 98% by volume of the electroconductive material, and the amorphous phase preferably contains a vanadium oxide and a phosphorus oxide.

In the electroconductive material according to the present invention, at least one of a grain boundary of the crystalline phase, a grain boundary of a primary particle of the $M_xV_2O_5$ crystallite, and a grain boundary of a secondary particle (agglomerated particle) of the $M_xV_2O_5$ crystallite is preferably composed of the amorphous phase.

In the electroconductive material according to the present invention, the amorphous phase may further contain at least one selected from the group consisting of a tungsten oxide, a molybdenum oxide, an iron oxide, a manganese oxide, a barium oxide, an antimony oxide and a bismuth oxide.

In the electroconductive material according to the present invention, the $M_xV_2O_5$ crystallite may have been precipitated through a heat treatment of a glass composition at a temperature equal to or higher than the crystallization onset temperature of the glass composition which includes a vanadium oxide and a phosphorus oxide and further include at least one selected from the group consisting of a lithium oxide, a sodium oxide, a potassium oxide, a copper oxide and a silver oxide.

In the electroconductive material according to the present invention, the glass composition may further include at least one selected from the group consisting of a tungsten oxide, a molybdenum oxide, an iron oxide, a manganese oxide, a barium oxide, an antimony oxide and a bismuth oxide.

In the electroconductive material according to the present invention, the glass composition may have a composition containing 62 to 92 percent by weight of $V_2O_5$; 5 to 20 percent by weight of $P_2O_5$; 1 to 15 percent by weight of at least one selected from the group consisting of $Li_2O$, $Na_2O$, $K_2O$, $Cu_2O$ and $Ag_2O$; and 0 to 22 percent by weight of at least one selected from the group consisting of $WO_3$, $MoO_3$, $Fe_2O_3$, $MnO_2$, $BaO$, $Sb_2O_3$ and $Bi_2O_3$ in terms of oxides, and the glass composition may have a transition temperature of 300° C. or lower and a crystallization onset temperature of 400° C. or lower.

In the electroconductive material according to the present invention, the glass composition may have a composition containing 70 to 80 percent by weight of $V_2O_5$; 8 to 14 percent by weight of $P_2O_5$; 1 to 5 percent by weight of one selected from the group consisting of $Li_2O$, $Na_2O$ and $K_2O$; and a total of 10 to 20 percent by weight of at least one of $WO_3$ and $Fe_2O_3$ in terms of oxides, and the glass composition may have a transition temperature of 300° C. or lower and a crystallization onset temperature of 400° C. or lower.

The electroconductive material according to the present invention preferably has a specific resistance of 200 Ω·cm or less at 25° C.

The positive electrode material for the lithium ion secondary battery according to the present invention may further contain a powder of the electroconductive material.

In the positive electrode material for the lithium ion secondary battery according to the present invention, the number x in the $M_xV_2O_5$ crystallite is preferably in the range of 0.28 to 0.41.

In the positive electrode material for the lithium ion secondary battery according to the present invention, the monovalent cation M in the $M_xV_2O_5$ crystallite may include at least one selected from the group consisting of Li, Na and K.

In the positive electrode material for the lithium ion secondary battery according to the present invention, the $M_xV_2O_5$ crystallite preferably has a lattice constant $\beta$ of 109.2° to 110.7°.

In the positive electrode material for a lithium ion secondary battery according to the present invention, the crystalline phase of the electroconductive material preferably occupies 80% to 95% by volume of the electroconductive material, and the $M_xV_2O_5$ crystallite preferably has a size of 100 nm to 300 nm in a direction of the (111) plane or (11-1) plane.

In the positive electrode material for the lithium ion secondary battery according to the present invention, the electroconductive material preferably has a specific resistance of 10 to 100 Ω·cm at 25° C.

In the positive electrode material for the lithium ion secondary battery according to the present invention, lithium ions may have been doped into the crystalline phase of the electroconductive material after the preparation of the electroconductive material.

The positive electrode material for the lithium ion secondary battery according to the present invention may further contain a carbon powder.

Certain embodiments according to the present invention will be illustrated below. It should be noted, however, these embodiments are not intended to limit the scope of the present invention, and appropriate alternations, modifications, and combinations are possible without departing from the spirit and scope of the present invention.

(Electroconductive Materials)

The present invention provides an electroconductive material which is a crystallized glass composition composed of a crystalline phase and an amorphous phase, the crystallized glass composition containing at least a vanadium oxide and a phosphorus oxide, the crystalline phase being a monoclinic vanadium-containing oxide, and the crystalline phase is larger than the amorphous phase by volume.

The crystalline phase preferably occupies 63% to 98% (by volume) of the electroconductive material, and the amorphous phase preferably occupies 2% to 37% (by volume) of the electroconductive material. The electroconductive material may have an excessively high specific resistance, if containing the crystalline phase in a volume less than 63% by volume. In contrast, the electroconductive material may show inferior chemical stability, if containing the crystalline phase in a volume more than 98% by volume.

When the electroconductive material is adopted as a battery material, the crystalline phase preferably occupies 80% to 95% (by volume), and the amorphous phase preferably occupies 5% to 20% (by volume) of the electroconductive material. For increasing the battery capacity, the more the $M_xV_2O_5$ crystalline phase occupies, the better. In contrast, for improving cycling performance, the more the amorphous phase having larger intervals between elements (i.e., the amorphous phase having larger intervals between constituent elements) occupies, the better.

Previous investigations demonstrate that the resulting battery has an insufficient battery capacity at a crystallization rate of less than 80%; and the battery has an inferior chemical stability and thereby shows an inferior cycling performance at a crystallization rate of more than 95%.

Preferably, at least one of a grain boundary of the crystalline phase, a grain boundary of the monoclinic $M_xV_2O_5$ crystallite (primary particle), and a grain boundary of a polycrystalline particle (secondary particle) including a multiplicity of the monoclinic $M_xV_2O_5$ crystallites is composed of the amorphous phase. Particularly when the electroconductive material is adopted as a battery material, the amorphous phase is preferably present at grain boundaries, because the amorphous phase has large ion intervals and thereby plays a role as a passage typically for lithium ions.

(Crystalline Phase)

Figure 2:
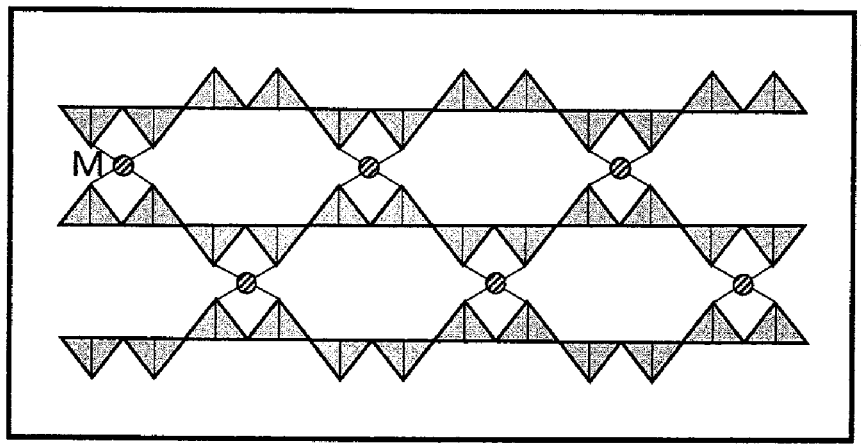
FIG. 2 is a schematic diagram of a model for a crystal structure of $M_xV_2O_5$.

FIG. 2 shows a model for a crystal structure of the monoclinic $M_xV_2O_5$.

This monoclinic crystal has a tubular structure in which atoms between layers in a layered structure of a vanadium oxide are orderly bonded with the cations (M). The monoclinic crystal used in the present invention is superior in a chemical stability to orthorhombic $V_2O_5$ crystals which laminate through electrostatic interactions.

In an embodiment, the monoclinic crystalline phase is composed of an $M_xV_2O_5$ crystallite, where M is a metal element which is stable in the state of a monovalent cation. The element M is preferably selected from the group consisting of Li, Na, K, Cu and Ag for satisfactory safety and availability.

The number x is preferably 0.28 to 0.76 for the formation of the monoclinic crystal. Particularly when the electroconductive material is adopted as a battery material, the number x is preferably 0.28 to 0.41, because the electroconductive material may have an insufficient space for the lithium ions, and the battery may have an insufficient battery capacity if x is excessively large.

The size (diameter) of the monoclinic $M_xV_2O_5$ crystallite is preferably 50 nm to 300 nm in a direction of the (111) plane or (11-1) plane (i.e., in the (111) plane or (11-1) plane). When the electroconductive material is adopted as a battery material, the size of the monoclinic crystallite is preferably 100 nm to 300 nm. This is because lithium ions should travel a larger distance and this may retard the charge/discharge speed if the crystallite size is excessively large; in contrast, the battery may have an insufficient battery capacity if the crystallite size is excessively small.

(Glass Composition and Amorphous Phase)

The glass composition preferably has a composition including 62 to 92 percent by weight of $V_2O_5$; 5 to 20 percent by weight of $P_2O_5$; 1 to 15 percent by weight of at least one of $Li_2O$, $Na_2O$, $K_2O$, $Cu_2O$ and $Ag_2O$; and 0 to 22 percent by weight of at least one of $WO_3$, $MoO_3$, $Fe_2O_3$, $MnO_2$, BaO, $Sb_2O_3$ and $Bi_2O_3$ in terms of oxides.

Vanadium pentoxide and phosphorus pentoxide are substances constituting the skeleton (backbone) of this glass composition. The glass of this system is vitrified in such a manner that pentahedron units of $VO_5$ having vanadium atom as the center and oxygen atoms as vertices undergo two-dimensional covalent bonding with each other via the oxygen atoms to form a layered structure, and $PO_4$ tetrahedron units are bonded between layers of the layered structure to form a glass.

If the content of $V_2O_5$ is less than 62 percent by weight, crystals may precipitate in a smaller amount, and this may impede the electroconductive material to have a low specific resistance. If the content of $V_2O_5$ exceeds 92 percent by weight, precipitated crystals may include an excessively large amount of $V_2O_5$ having a high specific resistance, thus being undesirable.

If the content of $P_2O_5$ is less than 5 percent by weight, the glass may not be formed. If the content of $P_2O_5$ exceeds 20 percent by weight, the electroconductive material may have an excessively high crystallization temperature.

$Li_2O$, $Na_2O$, $K_2O$, $Cu_2O$ and $Ag_2O$ are components that help the formation of the monoclinic crystal through firing, and it is known that $Li_2O$, $Na_2O$, $K_2O$, $Cu_2O$ and $Ag_2O$ intercalate into a space between $V_2O_5$ layers.

Precipitation of the monoclinic crystal may be difficult undesirably, both when the total content of these elements is less than 1 percent by weight and when it is more than 15 percent by weight. The metal element that is stable in the state of a monovalent cation is preferably at least one of Li, Na and K, because these elements are alkali metals which have low electronegativity and easily give a glass.

$WO_3$, $MoO_3$, $Fe_2O_3$, $MnO_2$, BaO, $Sb_2O_3$ and $Bi_2O_3$ are glass-modifying components. They are components for regulating properties of the glass amorphous phase, such as water resistance (moisture resistance), thermal expansion, and characteristic temperatures and can be added as appropriate. The water resistance of the glass increases with an increasing total amount of these components, but the total amount exceeding 22 percent by weight is undesirable, because the amount of the monoclinic crystal decrease in the electroconductive material. Independently, because the material having inferior water resistance is liable to absorb moisture, becomes unstable due to the absorbed moisture. The glass composition preferably contains 10 to 20 percent by weight of at least one of $WO_3$ and $Fe_2O_3$, because these materials are easily available and are highly safe.

(Formation of Crystalline Phase)

The glass composition of the electroconductive material according to the present invention preferably has a transition temperature of 300° C. or lower and a crystallization (onset) temperature of 400° C. or lower. The glass composition allows a crystalline phase to precipitate through a heat treatment at a temperature equal to or higher than the crystallization (onset) temperature. The state of formed crystal varies depending on the heat treatment conditions, because the crystalline phase grows in two stages, i.e. the formation of crystal nuclei and the growth of crystals. To give crystallites having smaller diameters (crystallite diameters), the glass composition is preferably maintained at the crystal nuclei formation temperature for a long duration to allow crystal nuclei to precipitate sufficiently, and the formed crystal nuclei are then allowed to grow.

For giving crystallites having larger diameters, it is general to allow the glass composition to pass through the crystal nuclei formation temperature in a short time, and maintain the formed crystal nuclei in a small number at a high temperature to allow crystals to grow. A device or process used in firing is not particularly limited, as long as being a device or process that can heat the non-crystalline (amorphous) glass at a temperature equal to or higher than the crystallization temperature. Exemplary devices or processes for use herein include a heating with a heater, a laser annealing, and an induction heating.

(Active Materials for Nonaqueous Secondary Batteries)

The electrode active material according to the present invention can be used as a positive electrode active material or a negative electrode active material typically by choosing other constituent materials of the battery, particularly by choosing an electrode active material constituting the other electrode.

Embodiments of the electrode active material as a positive electrode active material will be illustrated below.

When the material is used as a powder for a positive electrode active material of a lithium ion battery (LIB), the powder preferably has an average particle diameter of 1 to 10 μm. The powder may require a large amount of a dispersant to give a slurry, if having an average particle diameter of less than 1 μm, and this may cause the battery to have an insufficient battery capacity. In contrast, a surface of a coated film may become rough due to coarse particles contained in the powder, if the powder having an excessively large average particle diameter. And then the powder preferably has an average particle diameter of 10 μm or less. The powder more preferably has an average particle diameter of 1 to 7 μm, and still more preferably has an average particle diameter of 2 to 6 μm.

Such a slurry may be prepared by mixing 80 to 90 percent by weight of the powdery electroconductive material, 5 to 10 percent by weight of a carbon black acting as an electroconducting auxiliary, and 1 to 10 percent by weight of a fluorocarbon resin acting as a binder; and adding n-methylpyrrolidone as a solvent to the mixture to give a paste having a viscosity of about 15 Pa·s. The compounding ratio of components is not limited to one mentioned above, and can be appropriately chosen according typically to the required coatability and adhesion.

Some embodiments of the present invention will be illustrated in further detail with reference to several working examples below. It should be noted, however, that these examples are never intended to limit the scope of the present invention, and that various modifications, alternations, and combinations are possible without departing from the spirit and scope of the present invention.

EXAMPLES

[Investigation on Glass Composition]
(Preparation of Glass Compositions)

A series of glass compositions was prepared and investigated. Their compositions and properties are shown in Table 1. Each component is indicated by weight ratio in terms of oxide. Vanadium pentoxide, phosphorus pentoxide, iron oxide, antimony trioxide and tungsten trioxide were used as materials for respective components, and lithium carbonate was used as a lithium source.

The preparations of the glass compositions were performed according to the following procedure.

The material compounds were mixed to give a powdery mixture having the composition given in Table 1; 300 g of the powdery mixture was placed in a platinum crucible, heated in an electric furnace to 1100° C. at a temperature rise rate of 5° C. to 10° C. per minute, and held at this temperature for 2 hours. The mixture was stirred during holding at the temperature to give a homogeneous glass. Next, the platinum crucible was taken out from the electric furnace, and the mixture (composition) was poured from the crucible onto a stainless steel sheet previously heated at 200° C. to 300° C.

The compositions Nos. 1-02 and 1-03 had no gloss and were crystallized at the time when the compositions were poured onto the stainless steel sheet.

TABLE 1

| | Glass composition (wt. %) | | | | | | | | | | | | | | Glass properties | |
|---|---|---|---|---|---|---|---|---|---|---|---|---|---|---|---|---|
| | Vitrifying components | | Crystallization accelerating components | | | | | Glass functional auxiliary components | | | | | | | | | |
| No. | $V_2O_5$ | $P_2O_5$ | $Li_2O$ | $Na_2O$ | $K_2O$ | $Cu_2O$ | $Ag_2O$ | $Fe_2O_3$ | $WO_3$ | $Sb_2O_3$ | BaO | $MoO_3$ | $MnO_2$ | $Bi_2O_3$ | Tg (° C.) | Tcrys (° C.) |
| 1-01 | 90.5 | 8.0 | 1.5 | 0.0 | 0.0 | 0.0 | 0.0 | 0.0 | 0.0 | 0.0 | 0.0 | 0.0 | 0.0 | 0.0 | 220 | 253 |
| 1-02 | 90.0 | 8.0 | 2.0 | 0.0 | 0.0 | 0.0 | 0.0 | 0.0 | 0.0 | 0.0 | 0.0 | 0.0 | 0.0 | 0.0 | — | — |
| 1-03 | 90.0 | 5.0 | 5.0 | 0.0 | 0.0 | 0.0 | 0.0 | 0.0 | 0.0 | 0.0 | 0.0 | 0.0 | 0.0 | 0.0 | — | — |
| 1-04 | 88.8 | 8.9 | 2.3 | 0.0 | 0.0 | 0.0 | 0.0 | 0.0 | 0.0 | 0.0 | 0.0 | 10.0 | 0.0 | 0.0 | 248 | 339 |
| 1-05 | 88.8 | 8.9 | 2.3 | 0.0 | 0.0 | 0.0 | 0.0 | 0.0 | 0.0 | 0.0 | 0.0 | 0.0 | 6.1 | 0.0 | 258 | 345 |
| 1-06 | 88.0 | 10.0 | 2.0 | 0.0 | 0.0 | 0.0 | 0.0 | 0.0 | 0.0 | 0.0 | 0.0 | 0.0 | 0.0 | 0.0 | 235 | 260 |
| 1-07 | 87.0 | 8.0 | 0.0 | 0.0 | 0.0 | 0.0 | 0.0 | 0.0 | 0.0 | 5.0 | 0.0 | 0.0 | 0.0 | 0.0 | 236 | 301 |
| 1-08 | 86.3 | 9.5 | 0.0 | 4.2 | 0.0 | 0.0 | 0.0 | 0.0 | 0.0 | 0.0 | 0.0 | 0.0 | 0.0 | 0.0 | 238 | 262 |
| 1-09 | 85.5 | 8.0 | 1.5 | 0.0 | 0.0 | 0.0 | 0.0 | 5.0 | 0.0 | 0.0 | 0.0 | 0.0 | 0.0 | 0.0 | 238 | 286 |
| 1-10 | 80.0 | 10.0 | 1.0 | 0.0 | 0.0 | 0.0 | 0.0 | 9.0 | 0.0 | 0.0 | 0.0 | 0.0 | 0.0 | 0.0 | 259 | 322 |
| 1-11 | 80.0 | 8.0 | 2.0 | 0.0 | 0.0 | 0.0 | 0.0 | 10.0 | 0.0 | 0.0 | 0.0 | 0.0 | 0.0 | 0.0 | 256 | 342 |
| 1-12 | 79.4 | 10.2 | 2.1 | 0.0 | 0.0 | 0.0 | 0.0 | 8.3 | 0.0 | 0.0 | 0.0 | 0.0 | 0.0 | 9.1 | 242 | 268 |
| 1-13 | 78.2 | 7.8 | 0.0 | 4.2 | 0.0 | 0.0 | 0.0 | 9.8 | 0.0 | 0.0 | 0.0 | 0.0 | 0.0 | 0.0 | 255 | 350 |
| 1-14 | 78.0 | 9.6 | 2.0 | 0.0 | 0.0 | 0.0 | 0.0 | 0.0 | 0.0 | 0.0 | 10.4 | 0.0 | 0.0 | 0.0 | 257 | 315 |
| 1-15 | 78.0 | 8.9 | 3.1 | 0.0 | 0.0 | 0.0 | 0.0 | 10.0 | 0.0 | 0.0 | 0.0 | 0.0 | 0.0 | 0.0 | 257 | 336 |
| 1-16 | 78.0 | 8.0 | 4.0 | 0.0 | 0.0 | 0.0 | 0.0 | 10.0 | 0.0 | 0.0 | 0.0 | 0.0 | 0.0 | 0.0 | 248 | 317 |
| 1-17 | 77.2 | 7.6 | 0.0 | 10.0 | 0.0 | 0.0 | 0.0 | 0.0 | 0.0 | 0.0 | 5.2 | 0.0 | 0.0 | 0.0 | 231 | 285 |
| 1-18 | 76.5 | 7.7 | 0.0 | 0.0 | 6.2 | 0.0 | 0.0 | 9.6 | 0.0 | 0.0 | 0.0 | 0.0 | 0.0 | 0.0 | 257 | 348 |
| 1-19 | 75.0 | 10.0 | 2.0 | 0.0 | 0.0 | 0.0 | 0.0 | 8.0 | 5.0 | 0.0 | 0.0 | 0.0 | 0.0 | 0.0 | 259 | 274 |
| 1-20 | 75.0 | 13.3 | 1.7 | 0.0 | 0.0 | 0.0 | 0.0 | 10.0 | 0.0 | 0.0 | 0.0 | 0.0 | 0.0 | 0.0 | 267 | 286 |
| 1-21 | 74.7 | 17.4 | 1.1 | 0.0 | 0.0 | 0.0 | 0.0 | 6.8 | 0.0 | 0.0 | 0.0 | 0.0 | 0.0 | 0.0 | 295 | 315 |
| 1-22 | 74.4 | 9.1 | 0.0 | 6.3 | 0.0 | 0.0 | 0.0 | 10.2 | 0.0 | 0.0 | 0.0 | 0.0 | 0.0 | 0.0 | 261 | 340 |
| 1-23 | 74.1 | 7.4 | 0.0 | 0.0 | 0.0 | 9.2 | 0.0 | 9.3 | 0.0 | 0.0 | 0.0 | 0.0 | 0.0 | 0.0 | 260 | 350 |
| 1-24 | 72.5 | 18.2 | 2.1 | 0.0 | 0.0 | 0.0 | 0.0 | 7.2 | 0.0 | 0.0 | 0.0 | 0.0 | 0.0 | 0.0 | 316 | 384 |
| 1-25 | 72.4 | 12.8 | 0.0 | 0.0 | 5.1 | 0.0 | 0.0 | 9.6 | 0.0 | 0.0 | 0.0 | 0.0 | 0.0 | 0.0 | 271 | 290 |
| 1-26 | 72.0 | 13.3 | 1.7 | 0.0 | 0.0 | 0.0 | 0.0 | 8.0 | 5.0 | 0.0 | 0.0 | 0.0 | 0.0 | 0.0 | 269 | 287 |
| 1-27 | 72.0 | 8.8 | 0.0 | 0.0 | 9.3 | 0.0 | 0.0 | 9.9 | 0.0 | 0.0 | 0.0 | 0.0 | 0.0 | 0.0 | 259 | 338 |
| 1-28 | 70.1 | 7.0 | 0.0 | 0.0 | 0.0 | 0.0 | 14.0 | 8.8 | 0.0 | 0.0 | 0.0 | 0.0 | 0.0 | 0.0 | 250 | 338 |

TABLE 1-continued

| | Glass composition (wt. %) | | | | | | | | | | | | | | | |
|---|---|---|---|---|---|---|---|---|---|---|---|---|---|---|---|---|
| | Vitrifying components | | Crystallization accelerating components | | | | | Glass functional auxiliary components | | | | | | | Glass properties | |
| No. | $V_2O_5$ | $P_2O_5$ | $Li_2O$ | $Na_2O$ | $K_2O$ | $Cu_2O$ | $Ag_2O$ | $Fe_2O_3$ | $WO_3$ | $Sb_2O_3$ | $BaO$ | $MoO_3$ | $MnO_2$ | $Bi_2O_3$ | Tg (° C.) | Tcrys (° C.) |
| 1-29 | 68.7 | 12.4 | 0.0 | 0.0 | 0.0 | 7.5 | 0.0 | 7.4 | 4.0 | 0.0 | 0.0 | 0.0 | 0.0 | 0.0 | 271 | 290 |
| 1-30 | 68.7 | 8.4 | 0.0 | 0.0 | 0.0 | 13.5 | 0.0 | 9.4 | 0.0 | 0.0 | 0.0 | 0.0 | 0.0 | 0.0 | 255 | 356 |
| 1-31 | 67.9 | 10.3 | 1.1 | 0.0 | 0.0 | 0.0 | 0.0 | 9.6 | 5.6 | 0.0 | 5.5 | 0.0 | 0.0 | 0.0 | 285 | 376 |
| 1-32 | 67.1 | 10.1 | 0.0 | 2.2 | 0.0 | 0.0 | 0.0 | 9.5 | 5.5 | 0.0 | 5.5 | 0.0 | 0.0 | 0.0 | 289 | 382 |
| 1-33 | 66.7 | 8.5 | 0.0 | 0.0 | 0.0 | 0.0 | 14.0 | 7.0 | 3.8 | 0.0 | 0.0 | 0.0 | 0.0 | 0.0 | 254 | 275 |
| 1-34 | 65.6 | 11.8 | 0.0 | 0.0 | 0.0 | 0.0 | 11.6 | 7.1 | 3.9 | 0.0 | 0.0 | 0.0 | 0.0 | 0.0 | 273 | 295 |
| 1-35 | 65.0 | 8.5 | 1.5 | 0.0 | 0.0 | 0.0 | 0.0 | 10.0 | 10.0 | 0.0 | 5.0 | 0.0 | 0.0 | 0.0 | 300 | 368 |
| 1-36 | 63.3 | 9.6 | 0.0 | 0.0 | 0.0 | 0.0 | 7.8 | 9.0 | 5.2 | 0.0 | 5.2 | 0.0 | 0.0 | 0.0 | 281 | 374 |
| 1-37 | 61.6 | 21.0 | 0.0 | 2.3 | 0.0 | 0.0 | 0.0 | 0.0 | 0.0 | 10.4 | 4.7 | 0.0 | 0.0 | 0.0 | 330 | 495 |
| 1-38 | 61.2 | 12.8 | 1.1 | 0.0 | 0.0 | 0.0 | 0.0 | 9.6 | 9.8 | 0.0 | 5.5 | 0.0 | 0.0 | 0.0 | 306 | 415 |
| | 62~92 | 5~20 | | | 1~15 | | | | | | 0~25 | | | | 300 or less | 400 or less |

(Measurements of Properties of Glass Compositions)

The characteristic temperatures of glass samples were determined from peak temperatures as measured through differential thermal analysis (DTA) using glass powders. The glass powders as test specimens were prepared by pulverizing the glass compositions using a stamping mill.

(Preparation of Electroconductive Materials)

A series of electroconductive materials was prepared by processing each of the above-prepared glass composition to give a sample piece 10 mm long, 10 mm wide and 4 mm thick, placing the sample piece on an alumina substrate, heating the same at a temperature higher by 50° C. than its crystallization onset temperature for 50 hours to form a crystalline phase.

Evaluations of Properties of Electroconductive Materials

Next, the specific resistance of each sample at 25° C. was measured with a four-pin probe electrical resistance meter Loresta AP (supplied by Mitsubishi Chemical Corporation).

Each of the glass compositions after firing containing a crystalline phase was pulverized to give a powder, and the powder was subjected to crystal identification and measurements of crystallization rate and crystallite diameter using a wide-angle X-ray diffractometer (RINT 2500HL supplied by Rigaku Corporation). The crystal identification and measurement of crystallization rate were performed under the following conditions.

An X-ray source used herein was Cu, and the output thereof was set at 50 kV-250 mA. Using a focusing optical system equipped with a monochromator, the identification and measurement were performed at a divergence slit of 0.5 degree, a receiving slit of 0.15 mm, and a scattering slit of 0.5 degree. The X-ray diffraction was performed with scan axes of 2θ/θ coupled in the range of 5≦2θ≦100 degrees through continuous scanning at a scan speed of 1.0 degree per minute and sampling intervals of 0.01 degree. The crystal identification was performed by identifying crystals precipitated in the material using ICDD Data as an X-ray diffraction standard data list. The crystallization rate was determined by calculating the ratio of the diffraction peaks derived from crystals to the halos derived from the amorphous phase in the determined diffraction pattern. This ratio is considered to indicate the ratio by volume between the crystalline phase and the amorphous phase.

The crystallite diameter was determined by choosing a diffraction peak having a highest peak intensity out of diffraction peaks derived from crystals, defining this peak as a detected main peak, and calculating the crystallite diameter therefrom while using the (11-1) plane for $Li_{0.3}V_2O_5$ crystal and the (001) plane for $V_2O_5$ crystal.

Specifically, the crystallite diameter was determined in the following manner.

A detailed measurement was performed through narrow scanning at angles in the vicinity of the detected main peak. The measurement through narrow scanning was performed according to cumulative scanning while focusing the scan range to the vicinity of the detected main peak. The half-width of the detected main peak as determined through narrow scanning was substituted into the Scherrer's equation to give the crystallite diameter. Crystallite diameters of 100 nm or more were not measurable according to this technique, and the crystallite diameter of a sample having a crystallite diameter exceeding the measurement limit was determined under transmission electron microscopic observation.

(Moisture Resistance Test)

Moisture resistance tests were performed by placing each glass powder in a thermo-hygrostat at 85° C. and 85% for 48 hours. A sample having been dissolved or having undergone secondary aggregation was evaluated as having poor moisture resistance ("C"); a sample having been partially dissolved or having undergone partial secondary aggregation was evaluated as having moderate moisture resistance ("B"); and a sample having retained its powdery appearance was evaluated as having good moisture resistance ("A").

The results are shown in Table 2.

In Table 2, samples indicated by "Example" are samples satisfying conditions for the compositions of their material glass compositions before firing as given in Table 1, i.e. they satisfy the conditions: "63 to 88.8 percent by weight of $V_2O_5$", "7 to 17.4 percent by weight of $P_2O_5$", "1.1 to 14 percent by weight of at least one of $Li_2O$, $Na_2O$, $K_2O$, $Cu_2O$ and $Ag_2O$", and "0 to 22 percent by weight of at least one of $Fe_2O_3$, $WO_3$, $Sb_2O_3$, $BaO$, $MoO_3$, $MnO_2$ and $Bi_2O_3$". In contrast, samples which do not satisfy the above conditions in the composition of the glass composition before firing are indicated as "Comparative Example (Com. Ex.)".

A sample in Table 1 and another sample in Table 2 having identical last two figures of the sample number correspond to a material glass composition and an electroconductive material prepared by using the material glass composition, respectively. Specifically, for example, Sample No. 1-01 in Table 1 corresponds to Sample No. 2-01 in Table 2.

TABLE 2

| | | Properties after firing | | | | |
|---|---|---|---|---|---|---|
| No. | Main precipitated crystal | Crystallization rate (%) | Crystallite diameter (nm) | Resistivity ($\Omega \cdot cm$) | Moisture resistance | |
| 2-01 | $Li_{0.97}V_3O_8$ | 72 | 18 | 12,000 | C | Com. Ex. |
| 2-02 | $V_2O_5$ | 100 | 280 | 1,800 | A | Com. Ex. |
| 2-03 | $Li_{0.97}V_3O_8$ | 100 | 270 | 1,200 | A | Com. Ex. |
| 2-04 | $Li_{0.3}V_2O_5$ | 85 | 300 | 9 | C | Example |
| 2-05 | $Li_{0.3}V_2O_5$ | 88 | 260 | 12 | C | Example |
| 2-06 | $Li_{0.3}V_2O_5$ | 90 | 69 | 21 | C | Example |
| 2-07 | $V_2O_5$ | 78 | 80 | 320 | C | Com. Ex. |
| 2-08 | $Na_{0.287}V_2O_5$ | 88 | 68 | 33 | C | Example |
| 2-09 | $V_2O_5$ | 80 | 10 | 1,600 | C | Com. Ex. |
| 2-10 | $Li_{0.3}V_2O_5, V_2O_5$ | 70 | 49 | 878 | A | Com. Ex. |
| 2-11 | $Li_{0.3}V_2O_5$ | 89 | 72 | 10 | A | Example |
| 2-12 | $Li_{0.3}V_2O_5$ | 83 | 180 | 13 | B | Example |
| 2-13 | $Na_{0.287}V_2O_5$ | 87 | 71 | 12 | B | Example |
| 2-14 | $Li_{0.3}V_2O_5, V_2O_5$ | 70 | 40 | 250 | A | Com. Ex. |
| 2-15 | $Li_{0.3}V_2O_5$ | 91 | 51 | 21 | A | Example |
| 2-16 | $Li_{0.3}V_2O_5$ | 98 | 77 | 30 | A | Example |
| 2-17 | $Na_{0.76}V_2O_5$ | 91 | 53 | 91 | B | Example |
| 2-18 | $K_{0.33}V_2O_5$ | 89 | 73 | 13 | B | Example |
| 2-19 | $Li_{0.3}V_2O_5$ | 90 | 245 | 10 | A | Example |
| 2-20 | $Li_{0.3}V_2O_5$ | 85 | 146 | 25 | A | Example |
| 2-21 | $Li_{0.3}V_2O_5$ | 62 | 52 | 180 | B | Example |
| 2-22 | $Na_{0.76}V_2O_5$ | 92 | 50 | 20 | A | Example |
| 2-23 | $Cu_{0.261}(V_2O_5)$ | 85 | 70 | 11 | B | Example |
| 2-24 | $Li_{0.3}V_2O_5$ | 40 | 12 | 280 | C | Com. Ex. |
| 2-25 | $K_{0.33}V_2O_5$ | 84 | 168 | 24 | B | Example |
| 2-26 | $Li_{0.3}V_2O_5$ | 80 | 178 | 28 | A | Example |
| 2-27 | $K_{0.33}V_2O_5$ | 89 | 51 | 35 | B | Example |
| 2-28 | $Ag_{0.333}V_2O_5$ | 88 | 73 | 9 | A | Example |
| 2-29 | $Cu_{0.41}(V_2O_5)$ | 82 | 146 | 31 | A | Example |
| 2-30 | $Cu_{0.63}(V_2O_5)$ | 93 | 53 | 18 | A | Example |
| 2-31 | $Li_{0.3}V_2O_5$ | 82 | 72 | 48 | A | Example |
| 2-32 | $Na_{0.287}V_2O_5$ | 81 | 75 | 45 | A | Example |
| 2-33 | $Ag_{0.333}V_2O_5$ | 92 | 235 | 12 | A | Example |
| 2-34 | $Ag_{0.333}V_2O_5$ | 81 | 175 | 26 | A | Example |
| 2-35 | $Li_{0.3}V_2O_5$ | 60 | 24 | 206 | A | Com. Ex. |
| 2-36 | $Ag_{0.333}V_2O_5$ | 85 | 70 | 44 | A | Example |
| 2-37 | $Li_{0.3}V_2O_5$ | 30 | 11 | 350 | A | Com. Ex. |
| 2-38 | $Li_{0.3}V_2O_5, V_2O_5$ | 42 | 13 | 312 | A | Com. Ex. |
| | | 63~98% | 12~300 | 200 or less | | |

(Evaluation Results of Electroconductive Materials)

In Table 1, Sample Nos. 1-04, 1-05, 1-06, 1-08, 1-11, 1-12, 1-13, 1-15, 1-16, 1-17, 1-18, 1-19, 1-20, 1-21, 1-22, 1-23, 1-25, 1-26, 1-27, 1-28, 1-29, 1-30, 1-31, 1-32, 1-33, 1-34 and 1-36 are glass compositions corresponding to the examples.

In Table 2, Sample Nos. 2-04, 2-05, 2-06, 2-08, 2-11, 2-12, 2-13, 2-15, 2-16, 2-17, 2-18, 2-19, 2-20, 2-21, 2-22, 2-23, 2-25, 2-26, 2-27, 2-28, 2-29, 2-30, 2-31, 2-32, 2-33, 2-34 and 2-36 are electroconductive material samples corresponding to examples of the present invention.

In the examples in Table 2, precipitated main crystals ("Main precipitated crystal") are $Li_{0.3}V_2O_5$, $Na_{0.287}V_2O_5$, $Na_{0.76}V_2O_5$, $K_{0.33}V_2O_5$, $Cu_{0.261}(V_2O_5)$ and $Ag_{0.333}(V_2O_5)$ respectively. These crystals are compounds formed between a monovalent cation (M) and $V_2O_5$ and are crystals represented by $M_xV_2O_5$, in which x is 0.28 to 0.76. These samples according to the examples have crystallization rates of 62% or more and crystallite diameters of 50 nm or more.

The electroconductive materials prepared from these compositions show satisfactory electroconductivity in terms of specific resistance of 200 $\Omega \cdot cm$ or less.

In contrast, the electroconductive materials of Sample Nos. 2-01, 2-02, 2-03, 2-07, 2-09, 2-10, 2-14, 2-24, 2-35, 2-37 and 2-38 in Table 2 corresponding to comparative examples include $V_2O_5$ or $Li_{0.97}V_3O_8$ as a main precipitated crystal, or have a low crystallization rate of 60%, even if including a precipitated crystal of $Li_{0.3}V_2O_5$. These samples corresponding to the comparative examples after crystallization (firing) have specific resistance exceeding 200 $\Omega \cdot cm$ and are considered to be unsuitable as electroconductive materials.

(Measurement of Crystal Lattice Constants)

Next, samples having specific resistance of 200 $\Omega \cdot cm$ or less were subjected to X-ray diffractometry to give diffraction patterns, and crystal lattice constants thereof were calculated based on peaks appearing in the patterns.

Figure 8:
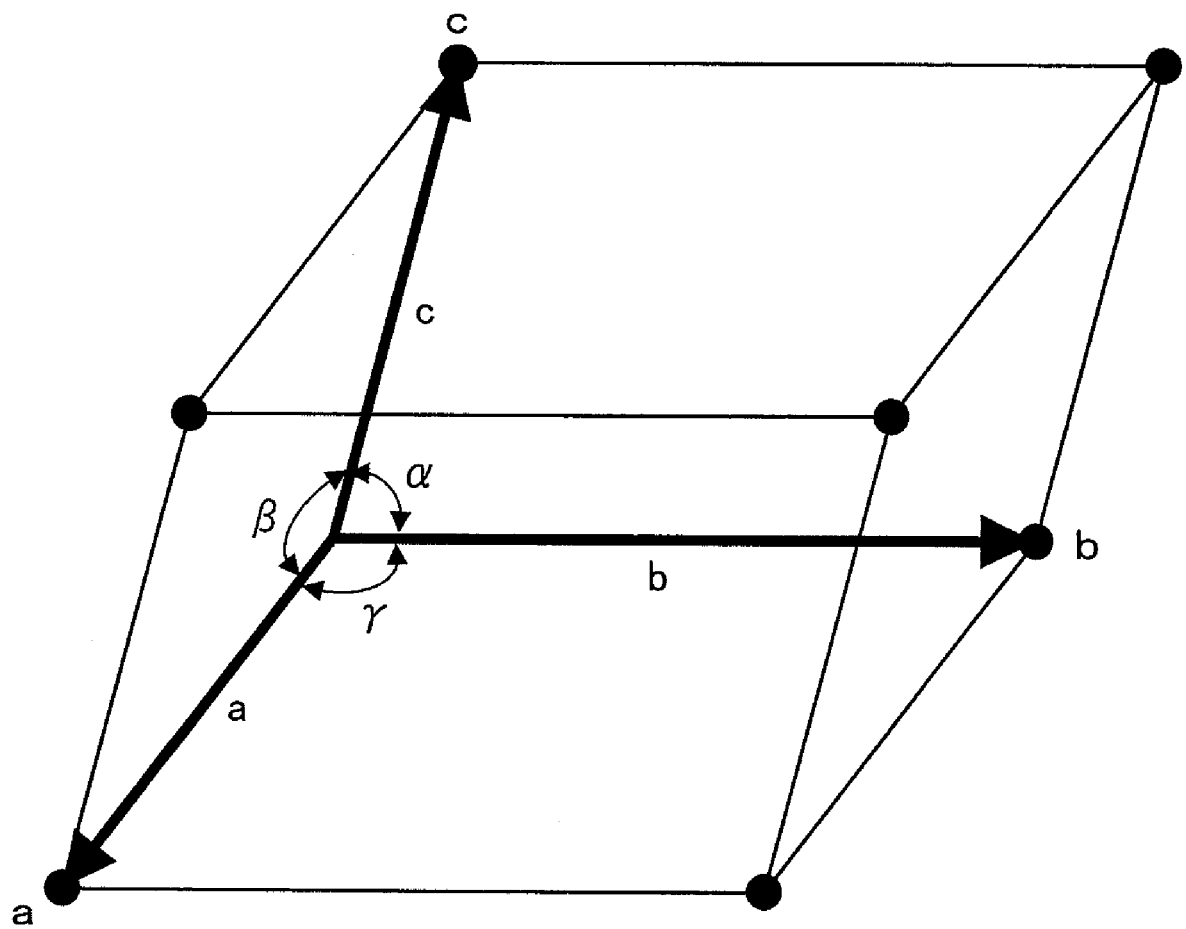
FIG. 8 is a schematic diagram of a unit cell of a crystal.

FIG. 8 is a schematic diagram of a unit cell of the crystal.

Lattice constants of the crystal unit cell will be defined below with reference to FIG. 8.

As shown in FIG. 8, the lengths of the unit cell in the a-axis, b-axis and c-axis are defined as a, b and c, respectively, and angular measures (angles) formed by two axes out of the three axes are defined as $\alpha$, $\beta$ and $\gamma$, respectively. These lengths and angles are lattice constants of the unit cell.

Table 3 shows the calculated lattice constants of the samples.

The crystalline parts (crystalline phases) of the electroconductive materials according to the examples have such lattice constants that a=1.003 to 1.016 nm, b=0.3580 to 0.3639 nm, c=1.510 to 1.6435 nm, $\alpha=\gamma=90°$, and $\beta=105.585$ to $110.4°$, the lattice constants demonstrating that these are monoclinic crystals.

TABLE 3

| No. | Crystal | a | b | c | α | β | γ |
|---|---|---|---|---|---|---|---|
| 2-04 | $Li_{0.3}V_2O_5$ | 1.0149 | 0.3590 | 1.5535 | 90 | 110.200 | 90 |
| 2-05 | $Li_{0.3}V_2O_5$ | 1.0150 | 0.3593 | 1.5538 | 90 | 110.100 | 90 |
| 2-06 | $Li_{0.3}V_2O_5$ | 1.0160 | 0.3595 | 1.5488 | 90 | 110.300 | 90 |
| 2-08 | $Li_{0.3}V_2O_5$ | 1.0159 | 0.3600 | 1.5491 | 90 | 110.400 | 90 |
| 2-11 | $Li_{0.3}V_2O_5$ | 1.0151 | 0.3593 | 1.5539 | 90 | 110.100 | 90 |
| 2-12 | $Li_{0.3}V_2O_5$ | 1.0147 | 0.3592 | 1.5494 | 90 | 110.200 | 90 |
| 2-13 | $Na_{0.287}V_2O_5$ | 1.0086 | 0.3612 | 1.6435 | 90 | 109.610 | 90 |
| 2-15 | $Li_{0.3}V_2O_5$ | 1.0154 | 0.3600 | 1.5550 | 90 | 110.000 | 90 |
| 2-16 | $Li_{0.3}V_2O_5$ | 1.0151 | 0.3593 | 1.5540 | 90 | 110.100 | 90 |
| 2-17 | $Na_{0.76}V_2O_5$ | 1.0066 | 0.3615 | 1.5413 | 90 | 109.290 | 90 |
| 2-18 | $K_{0.33}V_2O_5$ | 1.0039 | 0.3605 | 1.5335 | 90 | 109.200 | 90 |
| 2-19 | $Li_{0.3}V_2O_5$ | 1.0155 | 0.3594 | 1.5530 | 90 | 110.200 | 90 |
| 2-20 | $Li_{0.3}V_2O_5$ | 1.0148 | 0.3580 | 1.5535 | 90 | 110.200 | 90 |
| 2-21 | $Li_{0.3}V_2O_5$ | 1.0147 | 0.3590 | 1.5510 | 90 | 110.300 | 90 |
| 2-22 | $Na_{0.76}V_2O_5$ | 1.0068 | 0.3615 | 1.5410 | 90 | 109.300 | 90 |
| 2-23 | $Cu_{0.261}(V_2O_5)$ | 1.0101 | 0.3615 | 1.5240 | 90 | 107.250 | 90 |
| 2-25 | $K_{0.33}V_2O_5$ | 1.0040 | 0.3800 | 1.5334 | 90 | 109.100 | 90 |
| 2-26 | $Li_{0.3}V_2O_5$ | 1.0149 | 0.3595 | 1.5534 | 90 | 110.400 | 90 |
| 2-27 | $K_{0.33}V_2O_5$ | 1.0038 | 0.3604 | 1.5330 | 90 | 110.100 | 90 |
| 2-28 | $Ag_{0.333}V_2O_5$ | 1.0069 | 0.3615 | 1.5385 | 90 | 109.720 | 90 |
| 2-29 | $Cu_{0.41}(V_2O_5)$ | 1.0093 | 0.3638 | 1.5201 | 90 | 106.130 | 90 |
| 2-30 | $Cu_{0.63}V_2O_5$ | 1.0060 | 0.3638 | 1.5100 | 90 | 105.585 | 90 |
| 2-31 | $Li_{0.3}V_2O_5$ | 1.0150 | 0.3593 | 1.5530 | 90 | 110.200 | 90 |
| 2-32 | $Na_{0.287}V_2O_5$ | 1.0085 | 0.3611 | 1.6430 | 90 | 109.600 | 90 |
| 2-33 | $Ag_{0.333}V_2O_5$ | 1.0070 | 0.3617 | 1.5390 | 90 | 109.700 | 90 |
| 2-34 | $Ag_{0.333}V_2O_5$ | 1.0068 | 0.3614 | 1.5384 | 90 | 109.700 | 90 |
| 2-36 | $Ag_{0.333}V_2O_5$ | 1.0071 | 0.3617 | 1.5390 | 90 | 109.750 | 90 |

(Structures of Electroconductive Materials)

Figure 3A:
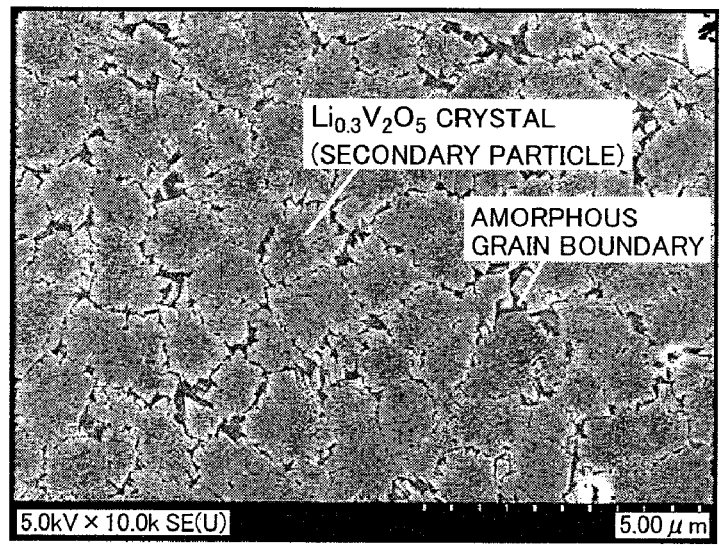
FIG. 3A is a scanning electron micrograph (SEM image) of an electroconductive material of an embodiment according to the present invention.
Figure 3B:
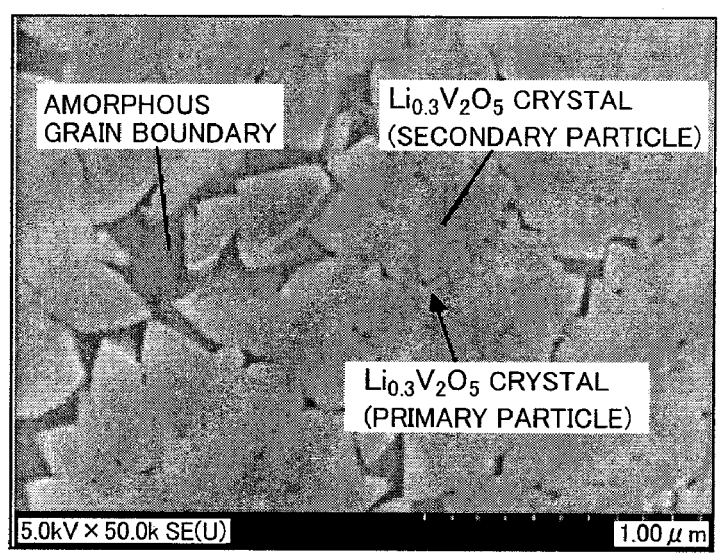
FIG. 3B is an enlarged image of the electroconductive material shown in FIG. 3A.
Figure 3C:
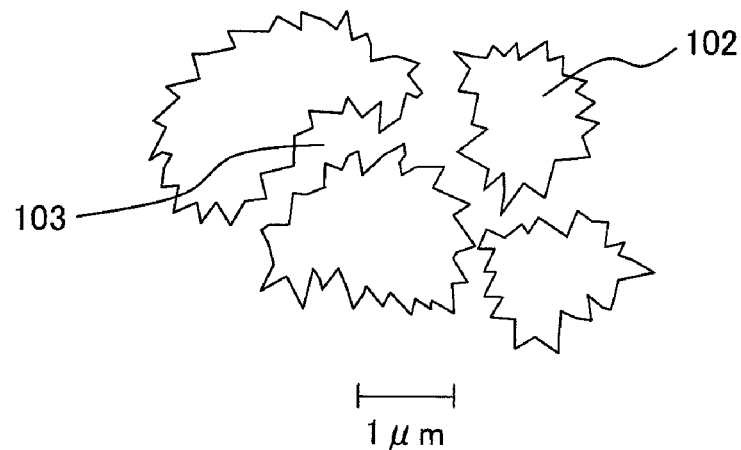
FIG. 3C is a schematic diagram of the scanning electron micrograph of the electroconductive material in FIG. 3A.

FIGS. 3A and 3B show SEM images of the electroconductive material No. 2-12 as an example according to the present invention (SEM is the abbreviation for a scanning electron microscope). FIG. 3B is an enlarged view of the image of FIG. 3A. FIG. 3C is a schematic diagram of the SEM image of the electroconductive material in FIG. 3A; and FIG. 3D is a schematic diagram of the enlarged view of the electroconductive material in FIG. 3B.

FIGS. 3A and 3C demonstrate that an amorphous grain boundary 103 is formed between adjacent secondary particles 102 of $Li_{0.3}V_2O_5$ crystals. As used herein the term "adjacent" means that "(being) next to each other".

Figure 3D:
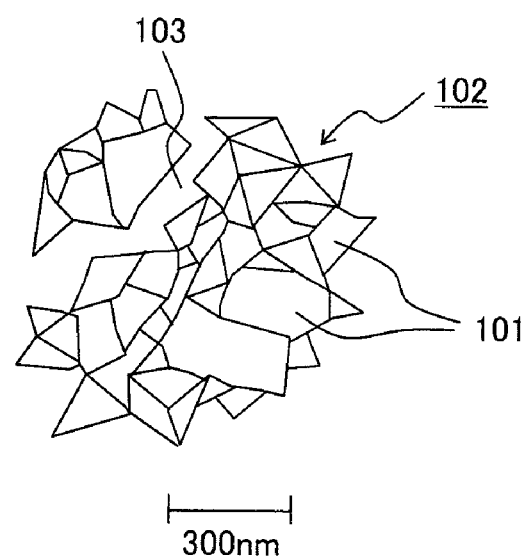
FIG. 3D is a schematic diagram of the enlarged image of the electroconductive material in FIG. 3B.

FIGS. 3B and 3D demonstrate that primary particles 101 of precipitated $Li_{0.3}V_2O_5$ crystals aggregate to form an aciniform secondary particle 102, and an amorphous grain boundary 103 (a layer of a glass amorphous phase) is formed around the secondary particle 102. FIG. 3B demonstrates that a fine amorphous grain boundary 103 is formed between the adjacent primary particles 101 of $Li_{0.3}V_2O_5$ crystals.

Figure 4:
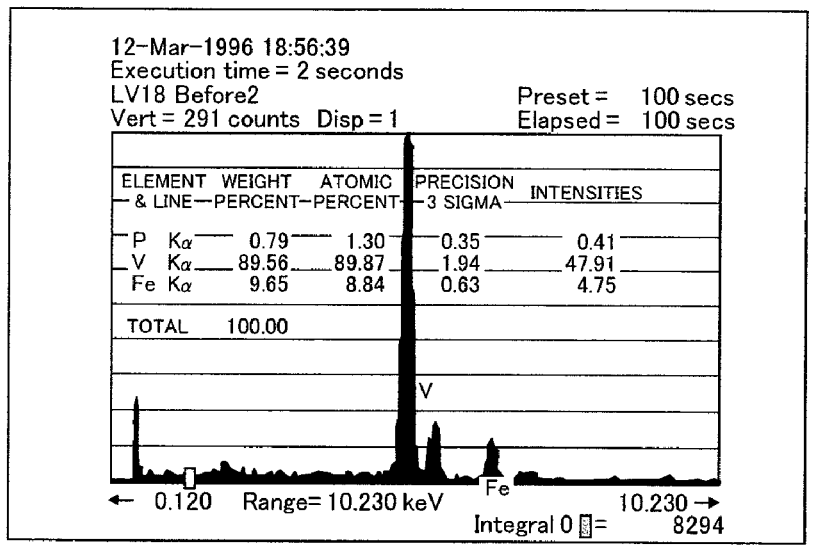
FIG. 4 is a graph showing data determined through a scanning electron microscopy with an energy dispersive X-ray analysis (SEM-EDX) of the crystalline phase ($Li_{0.3}V_2O_5$ crystal) shown in FIG. 3B.
Figure 5:
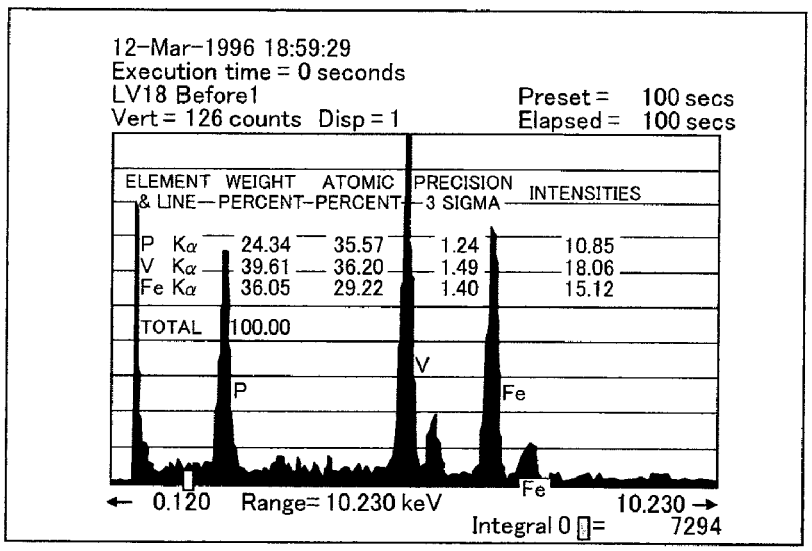
FIG. 5 is a graph showing data determined through the SEM-EDX of the amorphous phase (amorphous grain boundary) in FIG. 3B.

FIG. 4 is a graph showing a result of the SEM-EDX of the crystalline part ($Li_{0.3}V_2O_5$ crystal) in FIG. 3B; and FIG. 5 is a graph showing a result of the SEM-EDX of the amorphous phase (boundary between crystal grains) in FIG. 3B. As used herein "EDX" is the abbreviated name for an energy dispersive X-ray spectrometer.

FIG. 4 demonstrates that the crystalline phase contains a large amount of vanadium (V) and a trace amount of iron (Fe). FIG. 5 demonstrates that the amorphous phase contains iron (Fe) in an amount lager than that in the crystalline phase as shown in FIG. 4 and further contains phosphorus (P).

Specifically, the phosphorus content in the amorphous phase of the electroconductive material after firing is higher than that in the amorphous phase before firing.

(Investigations on Application to Lithium Ion Batteries)

Next, working examples of the electroconductive materials applied to lithium ion batteries will be illustrated.

Figure 6:
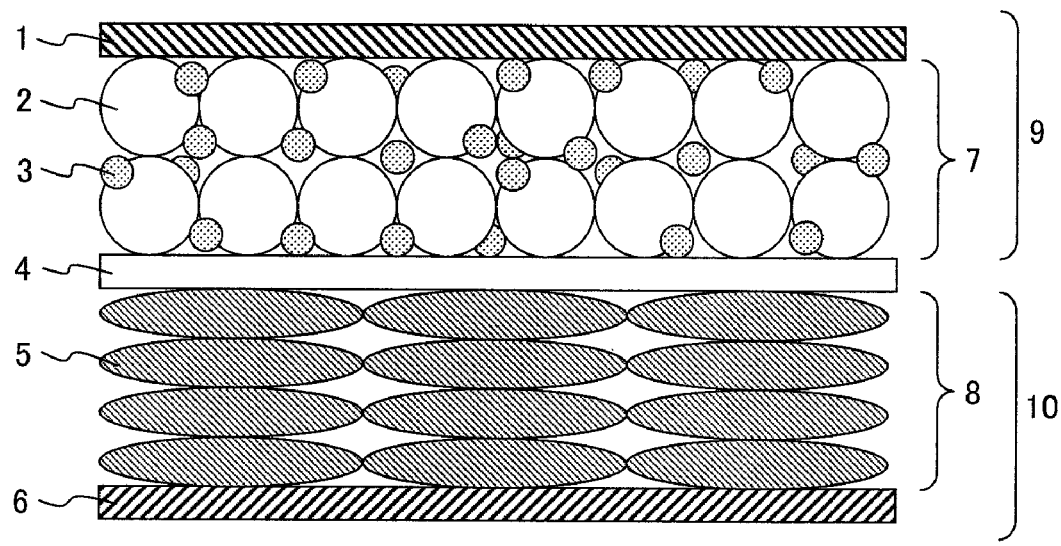
FIG. 6 is a cross-sectional view showing a structure of a lithium battery of an embodiment according to the present invention.

FIG. 6 is a schematic diagram of an exemplary lithium ion battery.

The lithium ion battery will be illustrated below with reference to FIG. 6.

Specifically, the electroconductive material acting as positive electrode active material 2 was pulverized to give a powder having an average particle diameter of 5 μm. Next, 85 percent by weight of the powder, 10 percent by weight of a carbon black (acting as electroconducting auxiliary 3), and 5 percent by weight of a binder were mixed, followed by combining with n-methylpyrrolidone to give a paste having a viscosity of 15 Pa·s. The prepared paste was applied to an aluminum foil acting as a positive electrode current collector 1 with a doctor blade, dried, and thereby yielded a positive electrode layer 7. Both the positive electrode layer 7 and the positive electrode current collector 1 were punched and thereby yielded a positive electrode 9.

Independently, a negative electrode layer 8 was formed from a negative electrode active material 5 on a copper foil acting as a negative electrode current collector 6, and was pressed with a roll. Both the negative electrode layer 8 and the negative electrode current collector 6 were punched in the same manner as in the positive electrode and thereby yielded a negative electrode 10.

A separator 4 was sandwiched between the positive electrode 9 and the negative electrode 10 to give a coin cell (a battery).

An electrolyte used herein was 1 mol/l $LiBF_4$ solution in a 1:3 mixture of ethylene carbonate (EC) and dichloroethane (DCE); and a lithium ion source used herein was a lithium foil.

Charge/discharge cycles of the coin cell were performed at a current density of 0.1 mA/cm² in the range of 4.2-1.5 V (vs. $Li/Li^+$), and an initial capacity and a capacity maintenance rate after 50 cycles of the coin cell were measured.

Table 4 shows determined properties of batteries (cells) each in a crystalline state.

The battery properties in Table 4 were evaluated as follows. A sample having the initial capacity of less than 330 mAh/g was evaluated as "C"; a sample having the initial capacity of 330 mAh/g or more and less than 350 mAh/g was evaluated as "B", a sample having the initial capacity of 350 mAh/g or more and less than 370 mAh/g was evaluated as "A", and a sample having the initial capacity of 370 mAh/g or more was evaluated as "AA". Samples having the capacity maintenance rates of 80% or less were all evaluated as "C" regardless of their initial capacities.

The moisture resistances as the active materials are cited from Table 2.

Comprehensive evaluations were performed based on the moisture resistance and battery properties. A sample evaluated as "C" in either one property was evaluated as "C"; a sample evaluated as "B" in the moisture resistance and "B" or "A" in the battery properties was evaluated as "B"; a sample evaluated "B" in the moisture resistance and "AA" in the battery properties was evaluated as "A"; and a sample evaluated as "A" in the moisture resistance and "A" or "AA" in the battery properties was evaluated as "AA".

Table 4 demonstrates that all samples having the crystallization rates of 80% or more have the initial capacities as the battery properties of 330 mAh/g or more, but that a sample having the crystallization rate of 100% has low cycling performance and is not desirable. Table 4 also demonstrates that samples having the crystallite diameters of 50 nm or more show satisfactorily large capacities, of which those having the crystallite diameters of 100 nm to 300 nm are more preferred.

TABLE 4

| No. | Main precipitated crystal | Properties after firing | | | Battery properties | | Evaluation | Moisture resistance | Comprehensive evaluation | |
|---|---|---|---|---|---|---|---|---|---|---|
| | | Crystallization rate (%) | Crystallite diameter (nm) | Resistivity (Ω·cm) | Initial capacity (mAh/g) | Capacity maintenance rate (%) | | | | |
| 3-03 | $Li_{0.97}V_2O_5$ | 100 | 270 | 1,200 | 335 | 65 | C | C | C | Com. Ex. |
| 3-04 | $Li_{0.3}V_2O_5$ | 85 | 300 | 9 | 384 | 95 | AA | C | C | Example |
| 3-05 | $Li_{0.3}V_2O_5$ | 88 | 260 | 12 | 378 | 94 | AA | C | C | Example |
| 3-06 | $Li_{0.3}V_2O_5$ | 90 | 69 | 21 | 356 | 91 | A | C | C | Example |
| 3-08 | $Na_{0.287}V_2O_5$ | 88 | 68 | 33 | 360 | 91 | A | C | C | Example |
| 3-09 | $V_2O_5$ | 80 | 10 | 1,600 | 318 | 85 | C | C | C | Com. Ex. |
| 3-10 | $Li_{0.3}V_2O_5, V_2O_5$ | 70 | 49 | 878 | 300 | 93 | C | B | C | Com. Ex. |
| 3-11 | $Li_{0.3}V_2O_5$ | 89 | 105 | 10 | 373 | 92 | AA | A | AA | Example |
| 3-12 | $Li_{0.3}V_2O_5$ | 83 | 180 | 13 | 386 | 96 | AA | B | A | Example |
| 3-13 | $Na_{0.287}V_2O_5$ | 87 | 71 | 12 | 356 | 95 | A | B | B | Example |
| 3-15 | $Li_{0.3}V_2O_5$ | 91 | 112 | 21 | 374 | 91 | AA | A | AA | Example |
| 3-16 | $Li_{0.3}V_2O_5$ | 98 | 105 | 30 | 380 | 90 | AA | A | AA | Example |
| 3-17 | $Na_{0.76}V_2O_5$ | 91 | 53 | 91 | 336 | 90 | B | B | B | Example |
| 3-18 | $K_{0.33}V_2O_5$ | 89 | 73 | 13 | 357 | 92 | A | B | B | Example |
| 3-19 | $Li_{0.3}V_2O_5$ | 90 | 245 | 10 | 386 | 92 | AA | A | AA | Example |
| 3-20 | $Li_{0.3}V_2O_5$ | 85 | 146 | 25 | 388 | 93 | AA | A | AA | Example |
| 3-21 | $Li_{0.3}V_2O_5$ | 62 | 52 | 180 | 333 | 89 | B | B | B | Example |
| 3-22 | $Na_{0.76}V_2O_5$ | 92 | 110 | 14 | 374 | 89 | AA | A | AA | Example |
| 3-23 | $Cu_{0.261}(V_2O_5)$ | 85 | 70 | 11 | 362 | 91 | A | B | B | Example |
| 3-24 | $Li_{0.3}V_2O_5$ | 40 | 12 | 280 | 295 | 98 | C | C | C | Com. Ex. |
| 3-25 | $K_{0.33}V_2O_5$ | 84 | 168 | 24 | 389 | 96 | AA | B | A | Example |
| 3-26 | $Li_{0.3}V_2O_5$ | 80 | 178 | 28 | 372 | 95 | AA | A | AA | Example |
| 3-27 | $K_{0.33}V_2O_5$ | 89 | 51 | 35 | 356 | 91 | A | B | B | Example |
| 3-28 | $Ag_{0.333}V_2O_5$ | 88 | 73 | 9 | 355 | 93 | A | A | A | Example |
| 3-29 | $Cu_{0.41}(V_2O_5)$ | 82 | 146 | 31 | 347 | 94 | A | A | A | Example |
| 3-30 | $Cu_{0.63}(V_2O_5)$ | 93 | 53 | 18 | 345 | 87 | B | A | A | Example |
| 3-31 | $Li_{0.3}V_2O_5$ | 82 | 72 | 48 | 358 | 96 | A | A | A | Example |
| 3-32 | $Na_{0.287}V_2O_5$ | 81 | 75 | 45 | 356 | 97 | A | A | A | Example |
| 3-33 | $Ag_{0.333}V_2O_5$ | 92 | 235 | 12 | 354 | 94 | A | A | A | Example |
| 3-34 | $Ag_{0.333}V_2O_5$ | 81 | 175 | 26 | 357 | 98 | A | A | A | Example |
| 3-35 | $Li_{0.3}V_2O_5$ | 60 | 24 | 195 | 290 | 99 | C | A | C | Com. Ex. |
| 3-36 | $Ag_{0.333}V_2O_5$ | 85 | 70 | 44 | 362 | 97 | A | A | A | Example |

(Doping of Lithium Ions)

Figure 7:
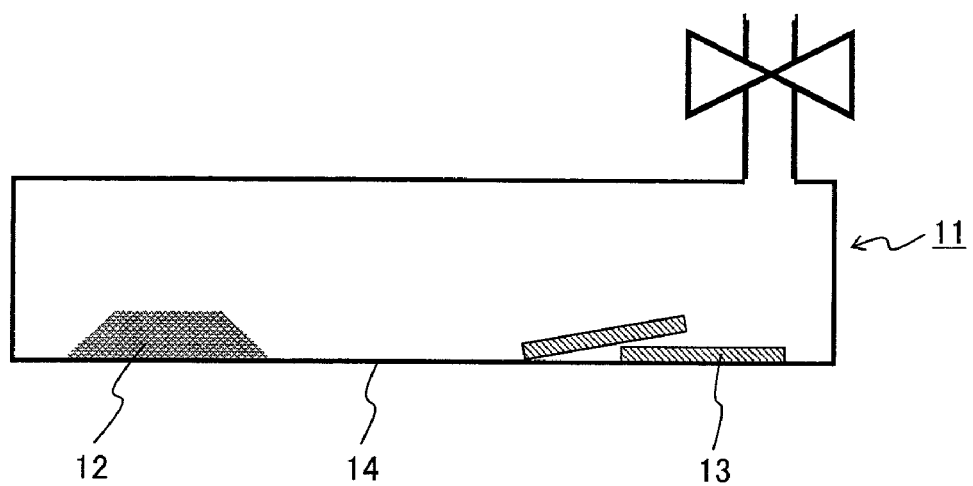
FIG. 7 is a schematic cross-sectional view showing a lithium ion doping apparatus.

FIG. 7 depicts a lithium ion doping apparatus.

The lithium ion doping apparatus 11 illustrated in FIG. 7 is made from a stainless steel (SUS), where the right and left portions of a reactor 14 can be heated independently while evacuating the inside of the reactor 14.

This apparatus was operated according to the following procedure.

The lithium ion doping apparatus 11 was placed in a glove box purged with nitrogen gas, and 10 g of the electroconductive material Sample No. 2-12 (reference numeral 12) and 5 g of metal lithium (reference numeral 13) were placed in the reactor 14 so that these were not in contact with each other. The left portion of the reactor 14 where the electroconductive material 12 was placed was heated with a ribbon heater with evacuation for 3 hours. Next, the reactor 14 was detached from the vacuum line by closing a valve thereof, and was heated at 350° C. in a heating mantle to be reacted for 2 weeks.

In a glove box where the dew point temperature is −90° C. (minus 90 degrees Celsius), the doped electroconductive material was taken out from the reactor 14, and the coin cell was prepared and properties of the coin cell were evaluated by the procedure as above, except for not using a lithium foil as a lithium source.

As a result, the coin cell was found to have satisfactory properties of the battery capacity (the initial capacity) of 372 mAh/g and the capacity maintenance rate of 82%.

What is claimed is:

1. An electroconductive material comprising a crystalline phase and an amorphous phase, containing at least a vanadium oxide and a phosphorus oxide, wherein the crystalline phase contains a monoclinic vanadium-containing oxide, and wherein a volume of the crystalline phase is larger than that of the amorphous phase.

2. The electroconductive material according to claim 1, wherein the monoclinic vanadium-containing oxide comprises a $M_xV_2O_5$ crystallite, where M is a monovalent cation; and x is in a range of 0.28 to 0.76, and wherein the $M_xV_2O_5$ crystallite has a diameter of 50 nm to 300 nm in a direction of a (111) plane or a (11-1) plane.

3. The electroconductive material according to claim 2, wherein the monovalent cation M of the $M_xV_2O_5$ crystallite comprises an element selected from the group consisting of Li, Na, K, Cu and Ag.

4. The electroconductive material according to claim 1, wherein the crystalline phase comprises monoclinic crystal having such lattice constants that a=1.003 to 1.010 nm, b=0.360 to 0.364 nm, c=1.520 to 1.542 nm, α=γ=90°, and β=105.5° to 110.7°.

5. The electroconductive material according to claim 1, wherein the crystalline phase occupies 63% to 98% by volume, and wherein the amorphous phase comprises a vanadium oxide and a phosphorus oxide.

6. The electroconductive material according to claim 2, wherein at least one of a grain boundary of the crystalline phase, a grain boundary of a primary particle of the $M_xV_2O_5$ crystallite, and a grain boundary of a secondary particle of the $M_xV_2O_5$ crystallite comprises the amorphous phase.

7. The electroconductive material according to claim 5, wherein the amorphous phase further comprises an oxide selected from the group consisting of a tungsten oxide, a molybdenum oxide, an iron oxide, a manganese oxide, a barium oxide, an antimony oxide and a bismuth oxide.

8. The electroconductive material according to claim 2, wherein the $M_xV_2O_5$ crystallite has been precipitated through a heat treatment of a glass composition at a temperature equal to or higher than the crystallization onset temperature of the glass composition, the glass composition comprising a vanadium oxide and a phosphorus oxide and further comprising an oxide selected from the group consisting of a lithium oxide, a sodium oxide, a potassium oxide, a copper oxide and a silver oxide.

9. The electroconductive material according to claim 8, wherein the glass composition further comprises an oxide selected from the group consisting of a tungsten oxide, a molybdenum oxide, an iron oxide, a manganese oxide, a barium oxide, an antimony oxide and a bismuth oxide.

10. The electroconductive material according to claim 8, wherein the glass composition has a composition comprising 62 to 92 percent by weight of $V_2O_5$; 5 to 20 percent by weight of $P_2O_5$; 1 to 15 percent by weight of at least one selected from the group consisting of $Li_2O$, $Na_2O$, $K_2O$, $Cu_2O$ and $Ag_2O$; and 0 to 22 percent by weight of at least one selected from the group consisting of $WO_3$, $MoO_3$, $Fe_2O_3$, $MnO_2$, $BaO$, $Sb_2O_3$ and $Bi_2O_3$ in terms of oxides, and
wherein the glass composition has a transition temperature of 300° C. or lower and a crystallization onset temperature of 400° C. or lower.

11. The electroconductive material according to claim 8, wherein the glass composition has a composition comprising 70 to 80 percent by weight of $V_2O_5$; 8 to 14 percent by weight of $P_2O_5$; 1 to 5 percent by weight of one selected from the group consisting of $Li_2O$, $Na_2O$ and $K_2O$; and 10 to 20 percent by weight of a sum of $WO_3$ and $Fe_2O_3$ in terms of oxides, and
wherein the glass composition has a transition temperature of 300° C. or lower and a crystallization onset temperature of 400° C. or lower.

12. The electroconductive material according to claim 1, having a specific resistance of 200 Ω·cm or less at 25° C.

13. A positive electrode material for a lithium ion secondary battery, comprising a powder of the electroconductive material according to claim 1.

14. The positive electrode material according to claim 13, wherein the monoclinic vanadium-containing oxide comprises a monoclinic $M_xV_2O_5$ crystallite, where M is a monovalent cation; and x in the monoclinic $M_xV_2O_5$ crystallite is in a range of 0.28 to 0.41.

15. The positive electrode material according to claim 13, wherein the monoclinic vanadium-containing oxide comprises a monoclinic $M_xV_2O_5$ crystallite, where M is a monovalent cation, and
wherein the monovalent cation M in the $M_xV_2O_5$ crystallite comprises an element selected from the group consisting of Li, Na and K.

16. The positive electrode material according to claim 13, wherein the monoclinic vanadium-containing oxide comprises a monoclinic $M_xV_2O_5$ crystallite, where M is a monovalent cation, and
wherein the $M_xV_2O_5$ crystallite has a lattice constant β in a range of 109.2° to 110.7°.

17. The positive electrode material according to claim 13, wherein the crystalline phase occupies 80% to 95% by volume,
wherein the monoclinic vanadium-containing oxide comprises a monoclinic $M_xV_2O_5$ crystallite, where M is a monovalent cation, and
wherein the $M_xV_2O_5$ crystallite has a size in a range of 100 nm to 300 nm in a direction of a (111) plane or a (11-1) plane.

18. The positive electrode material according to claim 13, wherein the electroconductive material has a specific resistance of 10 to 100 Ω·cm at 25° C.

19. The positive electrode material according to claim 13, wherein lithium ions have been doped into a crystalline phase of the electroconductive material after the preparation of the electroconductive material.

20. The positive electrode material according to claim 13, further comprising a carbon powder.

* * * * *